(12) United States Patent
Wen et al.

(10) Patent No.: US 10,911,113 B2
(45) Date of Patent: Feb. 2, 2021

(54) COMMUNICATION SYSTEM AND CODEC METHOD BASED ON DEEP LEARNING AND KNOWN CHANNEL STATE INFORMATION

(71) Applicant: INDUSTRIAL TECHNOLOGY RESEARCH INSTITUTE, Hsinchu Hsien (TW)

(72) Inventors: Chao-Kai Wen, Hsinchu (TW); Wan-Ting Shih, Hsinchu (TW); Ren-Jr Chen, Hsinchu (TW)

(73) Assignee: INDUSTRIAL TECHNOLOGY RESEARCH INSTITUTE, Hsinchu Hsien (TW)

( * ) Notice: Subject to any disclaimer, the term of this patent is extended or adjusted under 35 U.S.C. 154(b) by 34 days.

(21) Appl. No.: 16/354,266

(22) Filed: Mar. 15, 2019

(65) Prior Publication Data
US 2020/0220593 A1 Jul. 9, 2020

(30) Foreign Application Priority Data
Jan. 4, 2019 (TW) .............................. 108100273 A

(51) Int. Cl.
*H04B 7/0456* (2017.01)
*G06N 3/04* (2006.01)
(Continued)

(52) U.S. Cl.
CPC ......... *H04B 7/0478* (2013.01); *G06N 3/0445* (2013.01); *G06N 3/08* (2013.01); *H04B 7/0417* (2013.01); *H04B 7/0626* (2013.01)

(58) Field of Classification Search
CPC .. H04B 7/0478; H04B 7/0417; H04B 7/0626; G06N 3/0445; G06N 3/08
See application file for complete search history.

(56) References Cited

U.S. PATENT DOCUMENTS

| 7,839,945 B2 | 11/2010 | Khojastepour et al. |
| 8,457,265 B2 | 6/2013 | Sampath |

(Continued)

FOREIGN PATENT DOCUMENTS

| CN | 101442388 | 5/2009 |
| CN | 106100789 | 11/2016 |

(Continued)

OTHER PUBLICATIONS

Wen et. Al., Deep Learning for Massive MIMO CSI Feedback IEEE Wireless Communications Letters, pp. 748-750 vol. 7, No. 5, Oct. 2018.*

(Continued)

*Primary Examiner* — Kevin C. Harper
*Assistant Examiner* — Henry Baron
(74) *Attorney, Agent, or Firm* — Amin, Turocy & Watson, LLP

(57) ABSTRACT

A communication system and a codec method based on deep learning and known channel state information (CSI) are provided. The communication system includes: a first electronic apparatus including a known first link CSI and a CSI encoder having a deep learning function; and a second electronic apparatus including a known second link CSI and a CSI decoder having a deep learning function. The first and second link CSIs have a correlation or a similarity. The CSI encoder of the first electronic apparatus encodes or compresses the first link CSI into the first codeword, and feeds the first codeword back to the second electronic apparatus via a feedback link. The CSI decoder of the second electronic apparatus encodes or compresses the second link CSI into a second codeword, and decodes or restores the first link CSI of the first electronic apparatus based on the first codeword and the second codeword.

16 Claims, 8 Drawing Sheets

(51) Int. Cl.
  *G06N 3/08* (2006.01)
  *H04B 7/0417* (2017.01)
  *H04B 7/06* (2006.01)

(56) References Cited

U.S. PATENT DOCUMENTS

| | | |
|---|---|---|
| 9,621,194 B2 | 4/2017 | Brisebois |
| 2008/0219366 A1 | 9/2008 | Lau et al. |
| 2012/0218948 A1 | 8/2012 | Onggosanusi et al. |
| 2012/0270535 A1 | 10/2012 | Chen et al. |
| 2013/0201912 A1 | 8/2013 | Sheng et al. |
| 2014/0328422 A1 | 11/2014 | Chen et al. |

FOREIGN PATENT DOCUMENTS

| | | |
|---|---|---|
| CN | 106899524 | 6/2017 |
| CN | 107332598 | 11/2017 |
| CN | 108390706 | 8/2018 |
| CN | 108847876 | 11/2018 |
| TW | 201400842 | 1/2014 |

OTHER PUBLICATIONS

Taiwanese Office Action for Taiwanese Patent Application No. 108100273 dated Aug. 19, 2019.

Kuo, et al. "Compressive Sensing Based Channel Feedback Protocols for Spatially-Correlated Massive Antenna Arrays", IEEE WCNC: PHY and Fundamentals; Apr. 2012.

Rao, et al. "Distributed Compressive CSIT Estimation and Feedback for FDD Multi-User Massive MIMO Systems", IEEE Transactions on Signal Processing, vol. 62, No. 12; Jun. 15, 2014, pp. 3261-3271.

Wen, et al. "Deep Learning for Massive MIMO CSI Feedback", IEEE Wireless Commununications Letters, vol. 7, No. 5; Oct. 2018.

Tang, et al. "Downlink Path-Based Precoding in FDD Massive MIMO Systems Without CSI Feedback", IEEE Sensor Array and Multichannel Signal Processing Workshop; Jul. 2016; 1-4.

Love, et al. "An Overview of Limited Feedback in Wireless Communication Systems", IEEE Journal on Selected Areas in Communications; vol. 26, No. 8, Oct. 2008; 1341-1365.

Xu, et al. "CsVideoNet: A Real-time End-to-end Learning Framework for High-frame-rate Video Compressive Sensing", IEEE Winter Conference on Applications of Computer Vision (WACV); Mar. 2018; 1680-1688.

Yao, et al. "DR2-Net: Deep Residual Reconstruction Network for Image Compressive Sensing", http://arxiv.org/abs/1702.05743; Feb. 2017; 1-10.

Shi, et al. "Convolutional LSTM Network: A Machine Learning Approach for Precipitation Nowcasting", NIPS'15 Proceeding of the 28th International Conference on Neural Information Processing Systems; 2015; 802-810.

Wen, et al. "Deep Learning for Massive MIMO CSI Feedback", IEEE Wireless Communications Letters, Oct. 2018, vol. 7, Issue 5; pp. 748-751, Published Mar. 22, 2018.

* cited by examiner

| environment | compressing rate | the prior art ||||  | the present disclosure |
|---|---|---|---|---|---|---|
|  |  | LASSO | BM3D-AMP | TVAL3 | CsiNet |  |
| indoor | 1/16 | -2.72 | 0.26 | -2.61 | -8.65 | -15.23 |
|  | 1/32 | -1.03 | 24.72 | -0.27 | -6.24 | -12.08 |
|  | 1/64 | -0.14 | 27.53 | 0.63 | -5.84 | -9.23 |
| outdoor | 1/16 | -1.01 | 0.55 | -0.43 | -4.51 | -13.22 |
|  | 1/32 | -0.24 | 22.66 | 0.46 | -2.81 | -13.18 |
|  | 1/64 | -0.06 | 25.45 | 0.76 | -1.93 | -11.95 | unit: dB

FIG. 6

COMMUNICATION SYSTEM AND CODEC METHOD BASED ON DEEP LEARNING AND KNOWN CHANNEL STATE INFORMATION

CROSS REFERENCE TO RELATED APPLICATIONS

The present application is based on, and claims priority from, Taiwan Application Serial Number 108100273, filed on Jan. 4, 2019. The entirety of the above-mentioned patent application is hereby incorporated by reference herein and made a part of this specification.

BACKGROUND

1. Technical Field

This disclosure relates to communication systems and codec techniques, and, more particularly, to a communication system and a codec method based on deep learning and known channel state information.

2. Description of Related Art

In recent years, although the communication technology is developed rapidly, the spectrum that can be used is still very limited. Therefore, how to improve the efficiency of spectrum utilization in a limited spectrum is a difficult problem for advanced communication systems in the future. Among many technologies for improving the efficiency of spectrum use, The Multiple-Input Multiple-Output (MIMO) technology has received much attention, and is one of the key technologies in the next generation of wireless communication. The main reason is that the MIMO system has a beamforming function, a diversity gain function and a multiplexing gain function, and can simultaneously use multiple antennas and related communication signal processing technologies at a transmitting end and a receiving end. Therefore, the MIMO system can provide space freedom without increasing bandwidth, and effectively increasing system capacity and spectrum efficiency of communication systems.

The MIMO technology can be generally divided into two types of time division: time-division duplexing (TDD) and a frequency-division duplexing (FDD). The duplex technique in wireless communications refers to a method of two-way communication between a transmitting end and a receiving end by means of channel access so that two communication devices can mutually transmit data.

Massive multiple-input multiple-output (Massive MIMO) technology derived from the multiple-input multiple-output technology can significantly increase system capacity and spectrum efficiency, in order to support a larger number of users. As such, the Massive MIMO is widely recognized as the main technology of the fifth generation wireless communication system. Moreover, since the TDD an overly complex calibration process, most of the existing system use the FDD, allowing a frequency-division duplexing massive multiple-input multiple-output (FDD Massive MIMO) system to become the dominant development direction for the MIMO technology.

For most of the existing Massive frequency-division duplex MIMO systems, when the downlink is performed and the user equipment (UE) at the receiving end needs to feed channel state information (CSI) back to a base station (BS) at the transmitting end, the CSI needs to be simplified to allow the channel structure to exhibit sparse characteristics, and compressive Sensing (CS) is used to compress signals of the CSI.

However, there are three main problems in the method based on CS. First, the channel state information on any of bases is not sparse completely. and the result for the CS that requires a sparse matrix is not ideal. Second, the CS compression employs random projection to compress data, and does not take full advantage of the resulting characteristics of the channel. Third, the existing CS algorithms have to restore CSI after multiple iterations, resulting in an increase in system computational complexity and a reduction in the system execution timeliness.

Therefore, how to improve the performance of decoding or restoring CSI to solve the above-mentioned problems of the prior art has become an urgent issue in this technical field.

SUMMARY

A communication system and a codec method based on deep learning and known channel state information (CSI) are provided. A second electronic apparatus uses a known second link CSI to decodes or restores a first link CSI of a first electronic apparatus, to improve the performance of decoded and restored channel state information.

In an embodiment according to the present disclosure, a communication system based on deep learning and known channel state information (CSI) includes: a first electronic apparatus including a known first link CSI and a CSI encoder having a deep learning function; and a second electronic apparatus including a known second link CSI and a CSI decoder having a deep learning function, wherein the first link CSI and the second link CSI have a correlation or a similarity, the second electronic apparatus does not have the first link CSI of the first electronic apparatus in advance, the CSI encoder of the first electronic apparatus encodes or compresses the first link CSI into a first codeword and feeds the first codeword back to the second electronic apparatus via a feedback link, and the CSI decoder of the second electronic apparatus encodes or compresses the second link CSI into a second codeword and decodes or restores the first link CSI of the first electronic apparatus based on the first codeword and the second codeword.

In another embodiment according to the present disclosure, a codec method based on deep learning and known channel state information (CSI) includes: providing a first electronic apparatus including a known first link CSI and a CSI encoder having a deep learning function and a second electronic apparatus including a known second link CSI and a CSI decoder having a deep learning function, wherein the first link CSI and the second link CSI have a correlation or a similarity, and the second electronic apparatus does not have the first link CSI of the first electronic apparatus in advance; encoding or compressing, by the CSI encoder of the first electronic apparatus, the first link CSI into a first codeword, feeding the first codeword to the second electronic apparatus via a feedback link back, and encoding or compressing, by the CSI decoder of the second electronic apparatus, the second link CSI into a second codeword; and decoding or restoring, by the CSI decoder of the second electronic apparatus, the first link CSI of the first electronic apparatus based on the first codeword and the second codeword.

BRIEF DESCRIPTION OF DRAWINGS

The disclosure can be more fully understood by reading the following detailed description of the embodiments, with reference made to the accompanying drawings.

FIG. 6 is a comparison table between the present disclosure and the prior art in normalized mean square error (NMSE).

DETAILED DESCRIPTION

Figure 1:
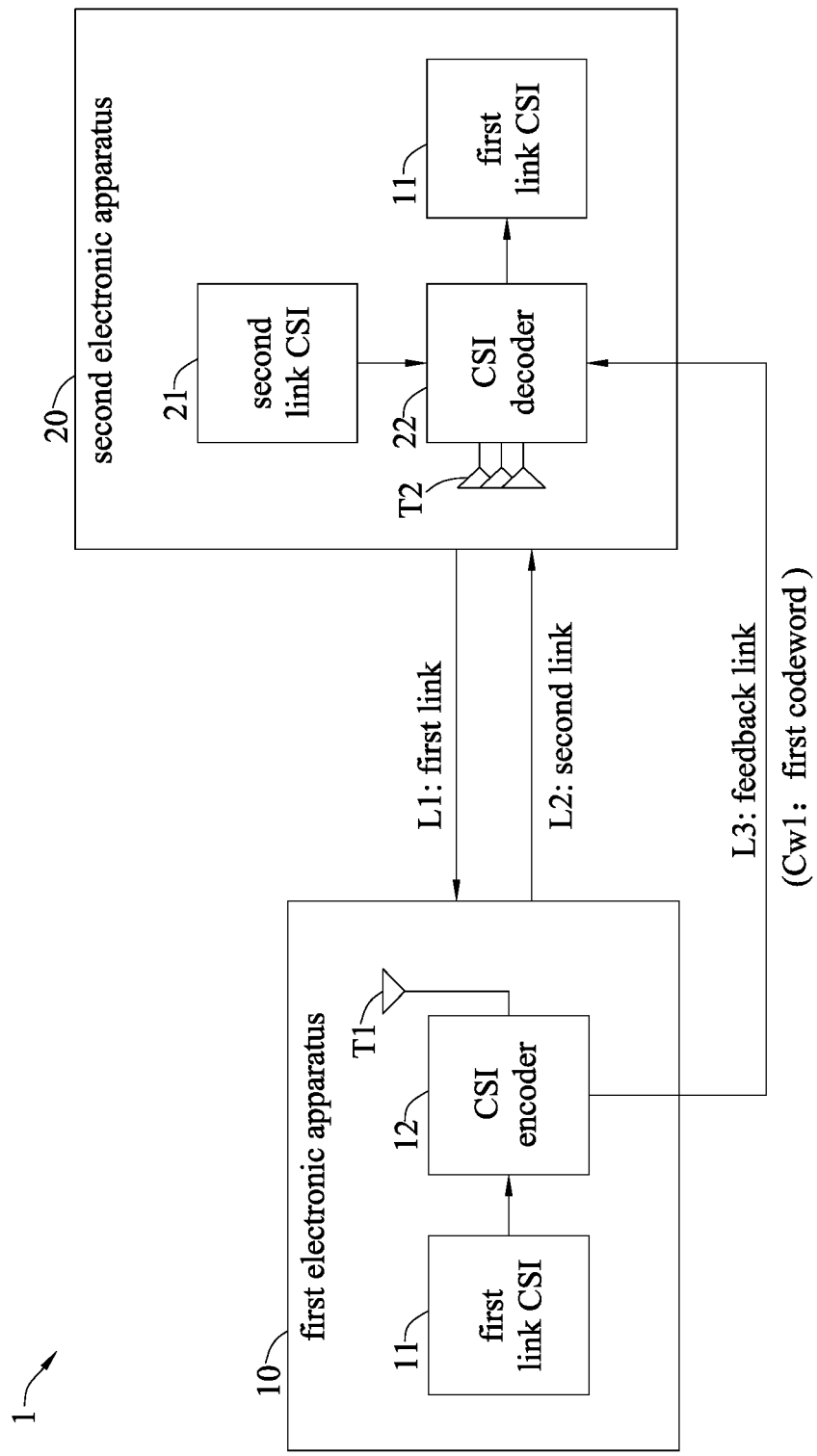
FIG. 1 is a schematic diagram of an architecture of a communication system based on deep learning and known channel state information according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of an architecture of a communication system 1 based on deep learning and known channel state information according to the present disclosure. The communication system 1 based on deep learning and known channel state information includes a first electronic apparatus 10 and a second electronic apparatus 20. In an embodiment, the first electronic apparatus 10 or the second electronic apparatus 20 may be, but not limited to, a user equipment (such as a smart phone, a tablet computer, a laptop computer and a smart watch) or a base station.

For example, in a frequency-division duplexing multiple-input multiple-output (FDD MIMO) system or a frequency-division duplexing massive multiple-input multiple-output (FDD Massive MIMO) system, the first electronic apparatus 10 includes one or more antennas T1, the second electronic apparatus 20 has a plurality of antennas T2, and the first electronic apparatus 10 and second electronic apparatus 20 can communicate or transmit data to each other via a first link L1 or a second link L2. In an embodiment, the first link L1 or the second link L2 may be a downlink, a parallel link or an uplink. In an embodiment, the second electronic apparatus 20 (e.g., a base station) acts as a transmission end, and transmits data to the first electronic apparatus 10 (e.g., user equipment) acting as a reception end via the first link L1 (e.g., a downlink). Alternatively, the first electronic apparatus 10 (e.g., a user equipment) acts as the transmission end and transmits data to the second electronic apparatus 20 (e.g., a base station) acting as the reception end via the second link L2 (e.g., an uplink).

The first electronic apparatus 10 includes a known first link CSI 11 and a CSI (channel state information) encoder 12 having a deep learning function. The second electronic apparatus 20 includes a known second link CSI 21 and a CSI decoder 22 having a deep learning function. The first link CSI 11 and the second link CSI 21 have a correlation or a similarity. The first electronic apparatus 10 does not have the second link CSI 21 of the second electronic apparatus 20 in advance. The second electronic apparatus 20 also does not have the first link CSI 11 of the first electronic apparatus 10 in advance. The CSI encoder 12 of the first electronic apparatus 10 encodes or compresses the first link CSI 11 into a first codeword Cw1, and feeds the first codeword Cw1 back to the second electronic apparatus 20 via a feedback link L3. The CSI decoder 22 of the second electronic apparatus 20 encodes or compresses the second link CSI 21 into a second codeword Cw2 (see FIG. 2) and decodes or restores the first link CSI 11 of the first electronic apparatus 10 based on the first codeword Cw1 and the second codeword Cw2.

Figure 2:
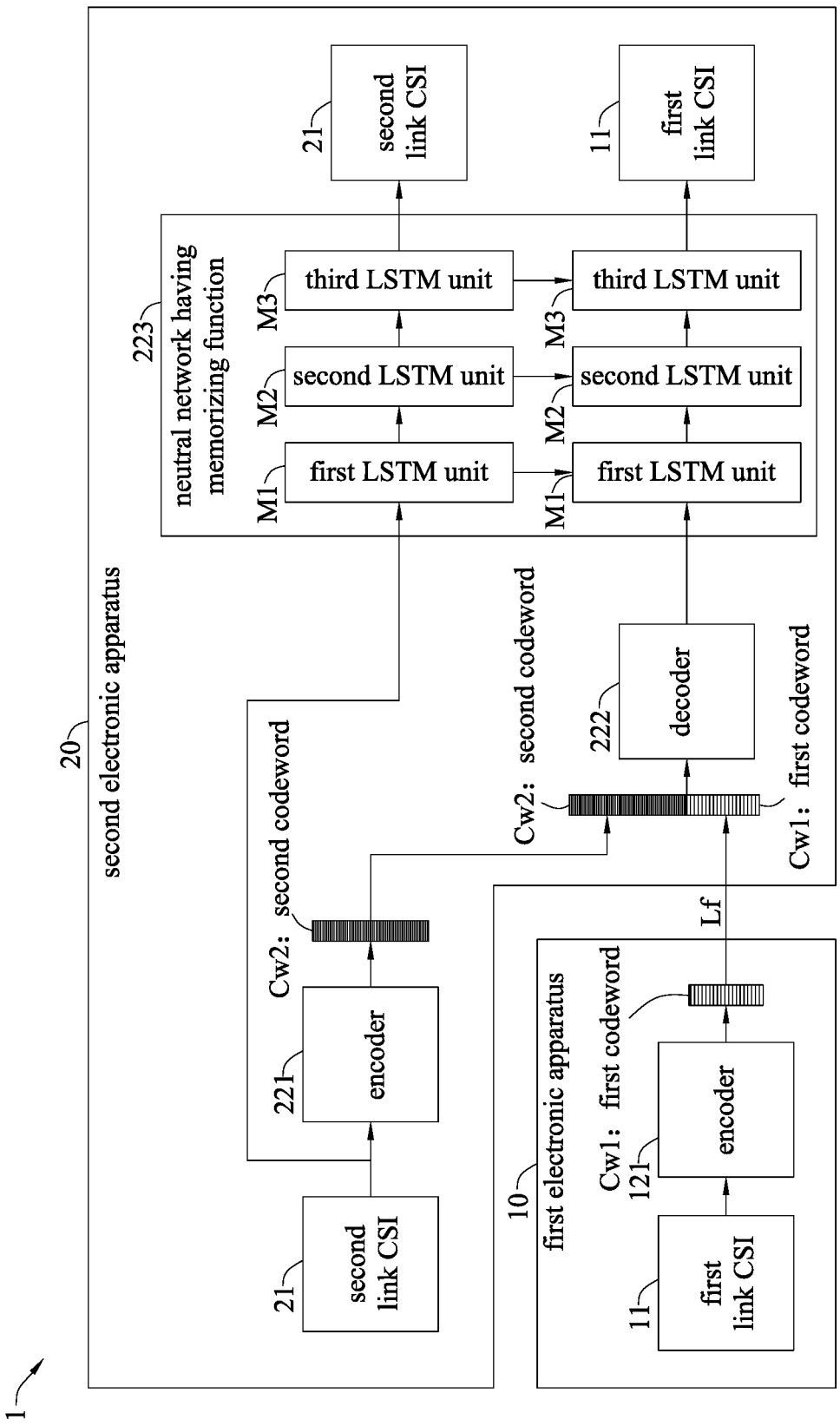
FIG. 2 is a schematic diagram of an embodiment of a communication system based on deep learning and known channel state information according to the present disclosure.
Figure 3A:
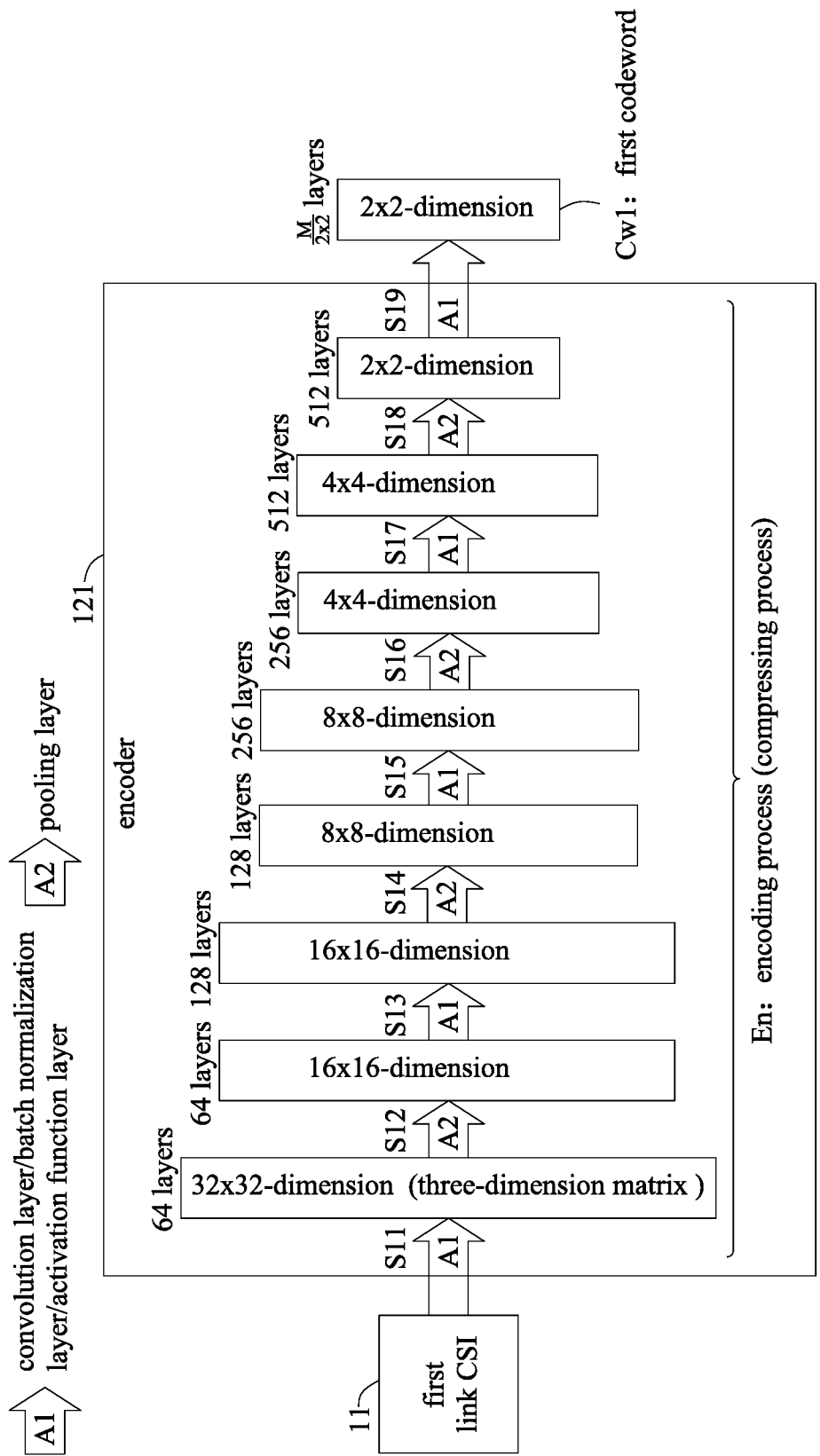
FIG. 3A is a schematic diagram of an encoder of a first electronic apparatus in FIG. 2 according to the present disclosure.
Figure 3B:
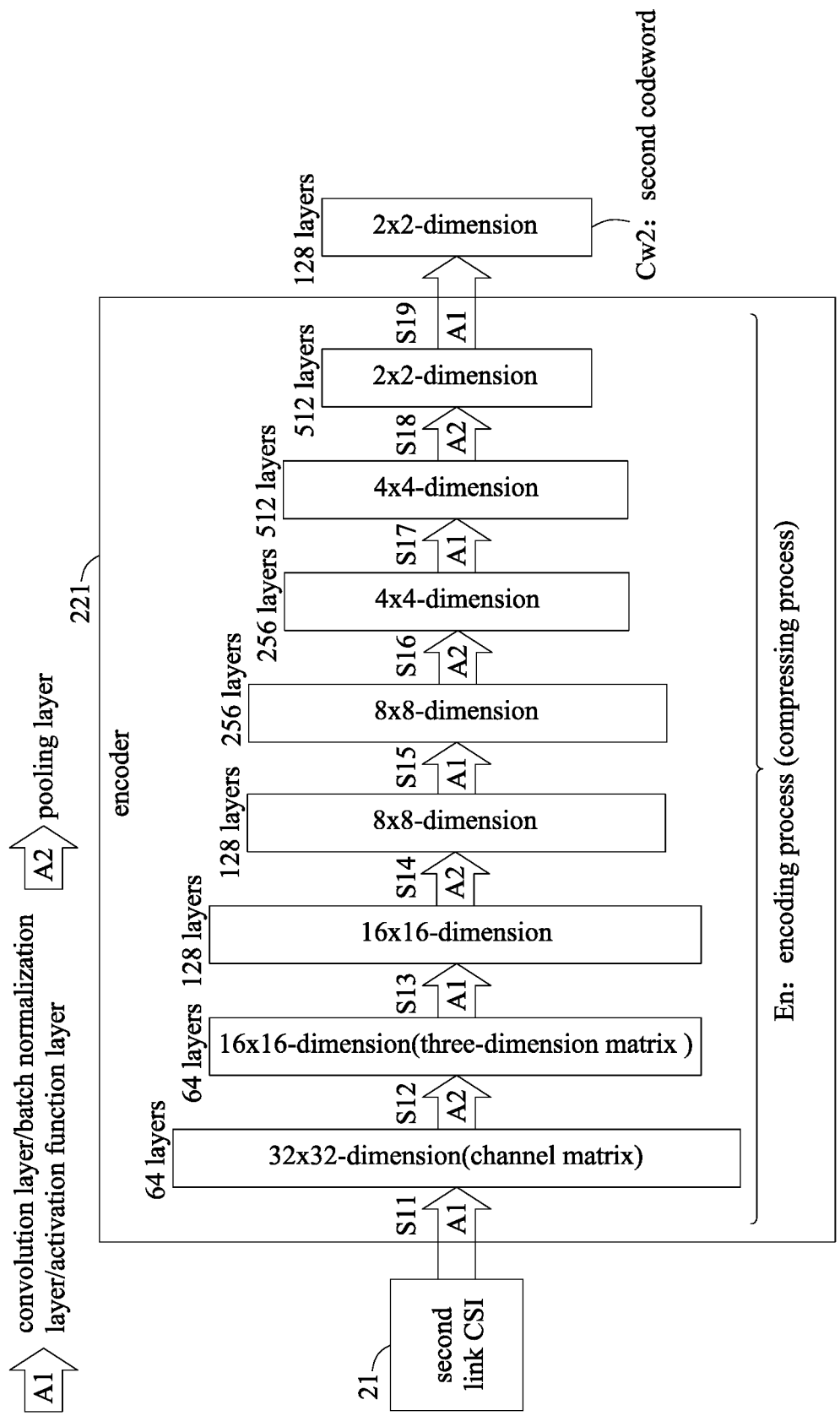
FIG. 3B is a schematic diagram of an encoder of a second electronic apparatus in FIG. 2 according to the present disclosure.
Figure 4:
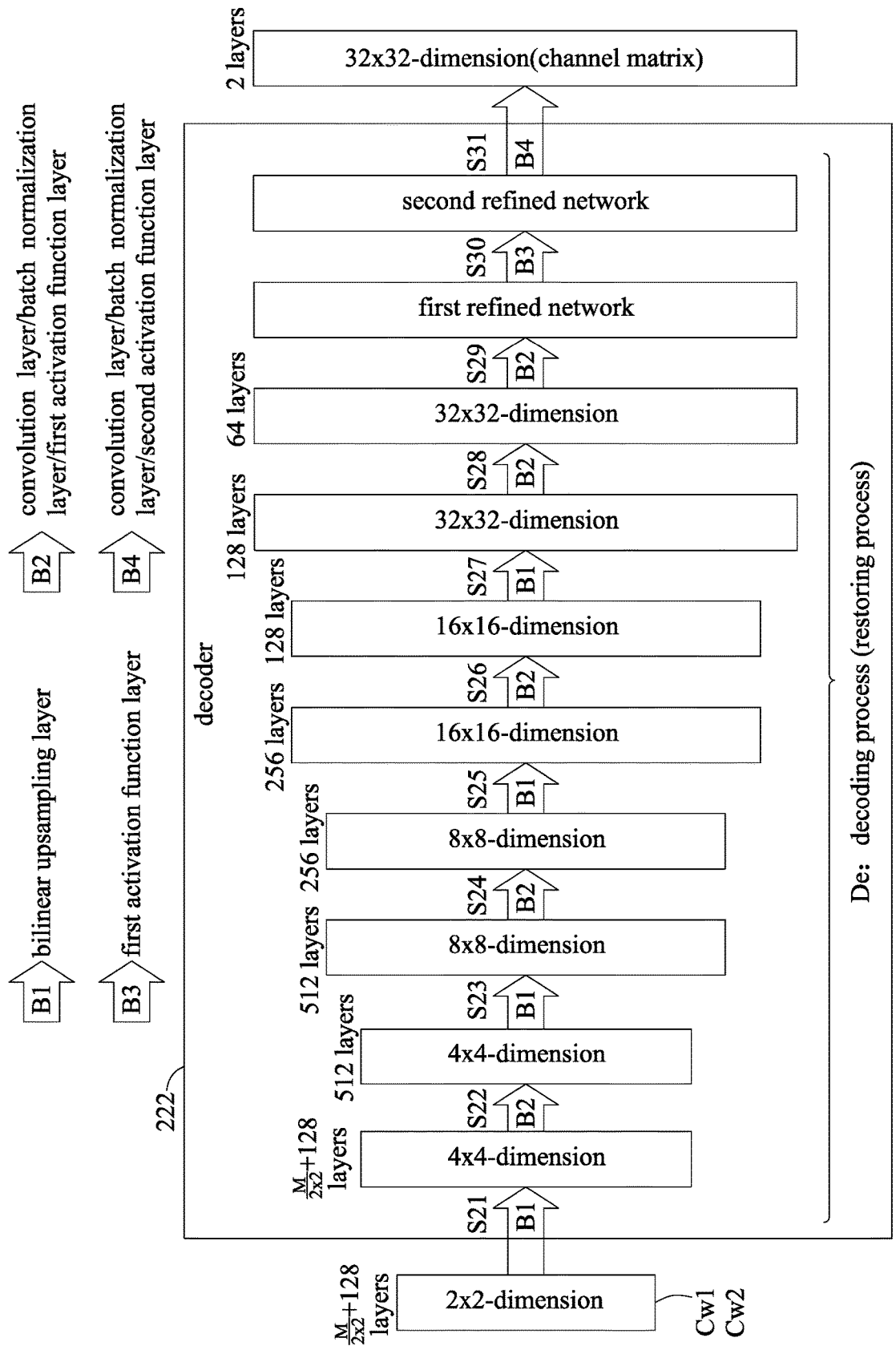
FIG. 4 is a schematic diagram of a decoder of a second electronic apparatus in FIG. 2 according to the present disclosure.

FIG. 2 is a schematic diagram of an embodiment of the communication system 1 based on deep learning and known channel state information according to the present disclosure. FIG. 3A is a schematic diagram of an encoder 121 of the first electronic apparatus 10 in FIG. 2 according to the present disclosure. FIG. 3B is a schematic diagram of an encoder 221 of the second electronic apparatus 20 in FIG. 2 according to the present disclosure. The encoder 121 of the first electronic apparatus 10 and the encoder 221 of the second electronic apparatus 20 have the same parameters (e.g., deep learning weights). FIG. 4 is a schematic diagram of a decoder 222 of the second electronic apparatus 20 in FIG. 2 according to the present disclosure.

As shown in FIGS. 1 and 2, the CSI encoder 12 of the first electronic apparatus 10 of FIG. 1 can pre-processes the first link CSI 11, and the CSI encoder 12 may include the encoder 121 of FIG. 2, and encode or compress the pre-processed first link CSI 11 into the first codeword Cw1 via the encoder 121.

As shown in FIGS. 2 and 3A, the encoder 121 of the first electronic apparatus 10 includes at least one of a convolution layer, a batch normalization layer, an activation function layer and a pooling layer, provides an encoding process or a compressing process En using the at least one of the convolution layer, the batch normalization layer, the activation function layer and the pooling layer, and encodes or compresses the first link CSI 11 into the first codeword Cw1 based on the encoding process or the compressing process. In an embodiment, the convolution layer is a 3×3 convolution layer, the activation function layer may be LeakyReLU (alpha=0.3), the LeakyReLU is a specific edition of a rectified linear unit (ReLU), and the pooling layer may be an average pooling layer.

The encoding process or the compressing process En of the encoder 121 of the first electronic apparatus 10 are described in, but not limited to, steps S11 to S19 in FIG. 3A.

In step S11, the encoder 121 of the first electronic apparatus 10 encodes or compresses the "first link CSI 11" into "three-dimension matrix of 64 32×32-dimension layers" via the convolution layer, the batch normalization layer and the activation function layer A1. In step S12, the encoder 121 encodes or compresses "three-dimension matrix of 64 32×32 layers" into "three-dimension matrix of 64 16×16-dimension layers" via the pooling layer A2. In step S13, the encoder 121 encodes or compresses "three-dimension matrix of 64 16×16-dimension layers" into "three-dimension matrix of 128 16×16-dimension layers" via the convolution layer, the batch normalization layer and the activation function layer A1.

In step S14, the encoder 121 encodes or compresses "three-dimension matrix of 128 16×16-dimension layers" into "three-dimension matrix of 128 8×8-dimension layers" via the pooling layer A2. In step S15, the encoder 121 encodes or compresses "three-dimension matrix of 128 8×8-dimension layers" into "three-dimension matrix of 256 8×8-dimension layers" via the convolution layer, the batch normalization layer and the activation function layer A1. In step S16, the encoder 121 encodes or compresses "three-dimension matrix of 256 8×8-dimension layers" into "three-dimension matrix of 256 4×4-dimension layers" via the pooling layer A2.

In step S17, the encoder 121 encodes or compresses "three-dimension matrix of 256 4×4-dimension layers" into "three-dimension matrix of 512 4×4-dimension layers" via the convolution layer, the batch normalization layer and the activation function layer A1. In step S18, the encoder 121 encodes or compresses "three-dimension matrix of 512 4×4-dimension layers" into "three-dimension matrix of 512 2×2-dimension layers" via the pooling layer A2. In step S19, the encoder 121 encodes or compresses "three-dimension matrix of 512 2×2-dimension layers" into "three-dimension matrix of M/(2×2) 2×2-dimension layers" via the convolution layer, the batch normalization layer and the activation function layer A1, and obtains the first codeword Cw1 based on "three-dimension matrix of M/(2×2) 2×2-dimension layers," where M/(2×2) is a positive integer, and M is a multiple of 4.

As shown in FIGS. 1 and 2, the CSI decoder 22 of the second electronic apparatus 20 of FIG. 1 includes an encoder 221 and a decoder 222 of FIG. 2. The encoder 221 encodes or compresses the second link CSI 21 into the second codeword Cw2. The decoder 222 decodes or restores the first codeword Cw1 and the second codeword Cw2 into a three-layer dimension channel matrix.

As shown in FIGS. 2 and 3B, the encoder 221 of the second electronic apparatus 20 includes at least one of a convolution layer, a batch normalization layer, an activation function layer and a pooling layer, provides an encoding process or a compressing process En using the at least one of the convolution layer, the batch normalization layer, the activation function layer and the pooling layer, and encodes or compresses the second link CSI 21 into the second codeword Cw2 based on the encoding process or the compressing process En.

The encoding process or the compressing process En (e.g., steps S11 to S19) that both the encoder 221 of the second electronic apparatus 20 in FIG. 3B and the encoder 121 of the first electronic apparatus 10 in FIG. 3B have, i.e., the encoding process or the compressing process En of both the encoder 121 and the encoder 221, have the same parameters (e.g., deep learning weights), allowing the encoder 121 and the encoder 221 to be replaced with each other. Therefore, it is not necessary to install two different encoding processes or compressing processes in the encoder 121 and the encoder 221. The first link CSI 11 in FIG. 3A can be inputted to the encoder 121 via the same encoding process or compressing process En outputting a three-dimension matrix of M/(2×2) 2×2-dimension layers (e.g., the first codeword Cw1). The second link CSI 21 in FIG. 3B can be inputted to the encoder 221 via the same encoding process or compressing process En outputting a three-dimension matrix of 128 2×2-dimension layers (e.g., the second codeword Cw2). The encoding process or the compressing process En of the encoder 221 in FIG. 3B is the same as the encoding process or the compressing process En of the encoder 121 in FIG. 3A, further description thereof hereby omitted.

As shown in FIGS. 2 and 4, the decoder 222 of the second electronic apparatus 20 includes at least one of a bilinear upsampling layer, a convolution layer, a batch normalization layer, a first activation function layer and a second activation function layer, provides a decoding process or a restoring process De using the at least one of the bilinear upsampling layer, the convolution layer, the batch normalization layer, the first activation function layer and the second activation function layer, and decodes or restores the first codeword Cw1 and the second codeword Cw2 into a three-layer dimension channel matrix based on the decoding process or the restoring process De. In an embodiment, the convolution layer is a 3×3 convolution layer, the first activation function layer is LeakyReLU (alpha=0.3), the LeakyReLU is a specific edition of a rectified linear unit (ReLU), and the second activation function layer is a sigmoid layer.

The decoding process or the restoring process De of the decoder 222 of the second electronic apparatus 20 are described in, but not limited to, steps S21 to S31 in FIG. 4.

In step S21, the decoder 222 of the second electronic apparatus 20 decodes or restores "three-dimension matrix of M/(2×2)+128 2×2-dimension layers (e.g., the first codeword Cw1 and the second codeword Cw2)" into "three-dimension matrix of M/(2×2)+128 4×4-dimension layers" via the bilinear upsampling layer B1. In step S22, the decoder 222 decodes or restores "three-dimension matrix of M/(2×2)+128 4×4-dimension layers" into "three-dimension matrix of 512 4×4-dimension layers" via the convolution layer, the batch normalization layer and the first activation function layer B2. In step S23, the decoder 222 decodes or restores "three-dimension matrix of 512 4×4-dimension layers" into "three-dimension matrix of 512 8×8-dimension layers" via the bilinear upsampling layer B1. In step S24, the decoder 222 decodes or restores "three-dimension matrix of 512 8×8-dimension layers" into "three-dimension matrix of 256 8×8-dimension layers" via the convolution layer, the batch normalization layer and the first activation function layer.

In step S25, the decoder 222 decodes or restores "three-dimension matrix of 256 8×8-dimension layers" into "three-dimension matrix of 256 16×16-dimension layers" via the bilinear upsampling layer B1. In step S26, the decoder 222 decodes or restores "three-dimension matrix of 256 16×16-dimension layers" into "three-dimension matrix of 128 16×16-dimension layers" via the convolution layer, the batch normalization layer and the first activation function layer B2. In step S27, the decoder 222 decodes or restores "three-dimension matrix of 128 16×16-dimension layers" into "three-dimension matrix of 128 32×32-dimension layers" via the bilinear upsampling layer B1. In step S28, the decoder 222 decodes or restores "three-dimension matrix of 128 32×32-dimension layers" into "three-dimension matrix of 64 32×32-dimension layers" via the convolution layer, the batch normalization layer and the first activation function layer B2.

In step S29, step S30 and step S31, the decoder 222 decodes or restores "three-dimension matrix of 64 32×32-dimension layers" into "channel matrix of 2 32×32-dimension layers (i.e., a three-layer dimension channel matrix)" via "the convolution layer, the batch normalization layer and the first activation function layer B2" shown in step S29, via "the first activation function layer B3 and the first refined network (e.g., RefineNet)" shown in step S30 and via "the convolution layer, the batch normalization layer, the second activation function layer B4 and a second refined network (e.g., RefineNet)" shown in step S31, respectively.

As shown in FIGS. 1 and 2, the CSI decoder 22 of the second electronic apparatus 20 further includes a neutral network 223 having a memorizing function configured for decoding or restoring the second link CSI 21 and the first link CSI 11 from the "channel matrix of a 2-layer 32×32-dimension (i.e., a three-layer dimension channel matrix)" described in step S31 in FIG. 4 via the neutral network 223 having the memorizing function. In an embodiment, the neutral network 223 having the memorizing function is a recurrent neutral network (RNN), or a long short-term memory network composed of multiple layers of long short-term memory (LSTM) units. In another embodiment, the neutral network 223 having the memorizing function is a long short-term memory network composed of three layers of a first LSTM unit M1, a second LSTM unit M2 and a third LSTM unit M3.

Figure 5:
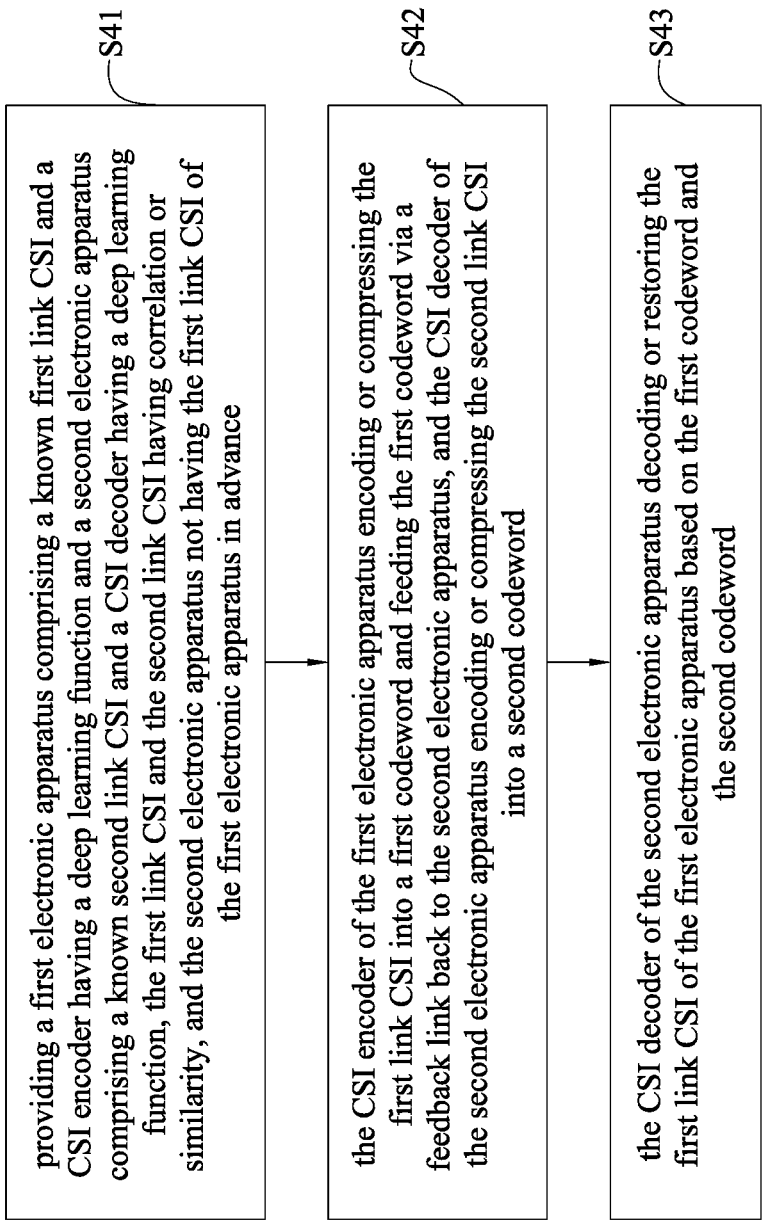
FIG. 5 is a flow chart of a codec method based on a deep learning and known channel state information according to the present disclosure.

FIG. 5 is a flow chart of a codec method based on deep learning and known channel state information (CSI) according to the present disclosure. Please also refer to FIGS. 1-4. The primary techniques of FIG. 5 are described in the following paragraphs, and the remaining technique contents are the same as those described in FIGS. 1-4. The description thereof is no longer repeated.

As shown in FIG. 5, in step S41, a first electronic apparatus 10 including a known first link CSI 11 and a CSI encoder 12 having a deep learning function and a second electronic apparatus 20 including a known second link CSI 21 and a CSI decoder 22 having a deep learning function are provided. The first link CSI 11 and the second link CSI 21 have a correlation or a similarity. The first electronic apparatus 10 does not have the second link CSI 21 of the second electronic apparatus 20 in advance, and the second electronic apparatus 20 also does not have the first link CSI 11 of the first electronic apparatus 10 in advance.

As shown in FIG. 5, in step S42, the CSI encoder 12 of the first electronic apparatus 10 encodes or compresses the first link CSI 11 into a first codeword Cw1 and feeds the first codeword Cw1 back to the second electronic apparatus 20 via a feedback link L3, and the CSI decoder 22 of the second electronic apparatus 20 encodes or compresses the second link CSI 21 into a second codeword Cw2.

In an embodiment, the CSI encoder 12 of the first electronic apparatus 10 pre-processes the first link CSI 11. The CSI encoder 12 includes an encoder 121 configured for encoding or compressing the pre-processed first link CSI 11 into the first codeword Cw1. In an embodiment, an encoding process or a compressing process En is provided by using at least one of a convolution layer, a batch normalization layer, an activation function layer and a pooling layer of the encoder 121, and the first link CSI 11 is encoded or compressed into the first codeword Cw1 based on the encoding process or the compressing process En.

The encoder 221 of the CSI decoder 22 of the second electronic apparatus 20 encodes or compresses the second link CSI 21 into the second codeword Cw2. In an embodiment, an encoding process or a compressing process En is provided by using at least one of a convolution layer, a batch normalization layer, an activation function layer and a pooling layer of the encoder 221, and the second link CSI 21 is encoded or compressed into the second codeword Cw2 via the encoding process or the compressing process En.

As shown in FIG. 5, in step S43, the CSI decoder 22 of the second electronic apparatus 20 decodes or restores the first link CSI 11 of the first electronic apparatus 10 based on the first codeword Cw1 and the second codeword Cw2.

The decoder 222 of the CSI decoder 22 decodes or restores the first codeword Cw1 and the second codeword Cw2 into a three-layer dimension channel matrix. In an embodiment, a decoding process or a restoring process De is provided by using at least one of a bilinear upsampling layer, a convolution layer, a batch normalization layer, a first activation function layer and a second activation function layer of the decoder 222 of the CSI decoder 22 of the second electronic apparatus 20, and the first codeword Cw1 and the second codeword Cw2 are decoded or restored into the three-layer dimension channel matrix based on the decoding process or the restoring process De. A neutral network 223 having a memorizing function in the CSI decoder 22 of the second electronic apparatus 20 decodes or restores the first link CSI 11 from the three-layer dimension channel matrix. In an embodiment, the neutral network 223 having the memorizing function is a recurrent neutral network (RNN) or a long short-term memory network composed of multiple layers of long short-term memory (LSTM) units.

FIG. 6 is a comparison table between the present disclosure and the prior art in normalized mean square error (NMSE). The difference between the channel matrix of the rebuilt first link and the channel matrix of the original first link can be obtained via normalized mean square errors (NMSEs). In FIG. 6, LASSO of the prior art is a least absolute shrinkage and selection operator technique, BM3D-AMP of the prior art is a block matching and 3D filtering-approximate message passing technique, TVAL3 of the prior art is a total variation minimization by augmented Lagrangian technique, and CsiNet of the prior art is a channel state information (CSI) network technique.

The actual test results show that in an indoor environment, when the compression ratios of the first link CSI of the first electronic apparatus are $\frac{1}{16}$, $\frac{1}{32}$ and $\frac{1}{64}$, respectively, the normalized mean square errors (NMSEs) of the prior art LASSO are −2.72, −1.03 and −0.14 (dB), respectively, while the normalized mean square errors (NMSEs) of the present disclosure are −15.23, −12.08 and −9.23 (dB), respectively, which are all smaller than the normalized mean square errors (NMSEs) of the prior art LASSO. Such test results indicate that the present disclosure, which decodes a first link CSI of a first electronic apparatus via deep learning and known channel state information, has a better performance than the prior art.

In addition, the actual test results show that in an outdoor environment, when the compression ratios of the first link CSI of the first electronic apparatus are $\frac{1}{16}$, $\frac{1}{32}$ and $\frac{1}{64}$, respectively, the normalized mean square errors (NMSEs) of the prior art LASSO are −1.01, −0.24 and −0.06 (dB), respectively, while the normalized mean square errors (NMSEs) of the present disclosure are −13.22, −13.18 and −11.95 (dB), respectively, which are all smaller than the normalized mean square errors (NMSEs) of the prior art LASSO. The test results indicate that the present disclosure, which decodes a first link CSI of a first electronic apparatus via deep learning and known channel state information, has a better performance than the prior art.

Similarly, in an indoor or outdoor environment, when the compression ratios of the first link CSI of the first electronic apparatus are $\frac{1}{16}$, $\frac{1}{32}$ and $\frac{1}{64}$, respectively, the normalized mean square errors (NMSEs) of the present disclosure are all smaller than the normalized mean square errors (NMSEs) of the prior art BM3D-AMP, TVAL3 and CsiNet. This indicates that the present disclosure, which decodes a first link CSI of a first electronic apparatus via deep learning and known channel state information, has a better performance than the prior art.

Figure 7:
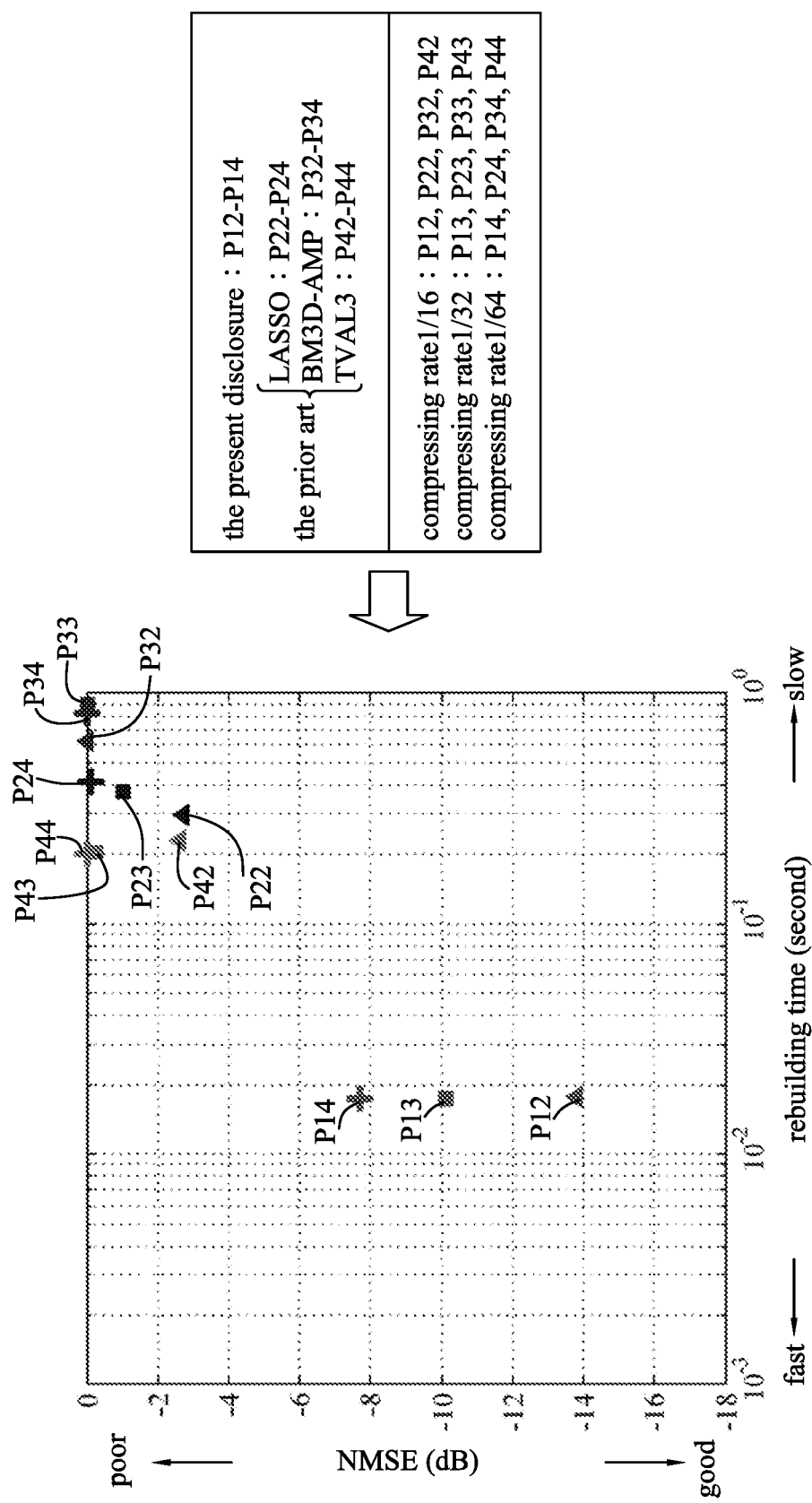
FIG. 7 is a comparison diagram of reconstruction time of a first link CSI between the present disclosure and the prior art.

FIG. 7 is a comparison diagram of reconstruction time of a first link CSI between the present disclosure and the prior art. When The compression ratios of the first link CSI of the first electronic apparatus are sequentially from low to high compression ratios of 1/16, 1/32 and 1/64, the present disclosure is in the order of points P12, P13 and P14, the prior art LASSO is in the order of points P22, P23 and P24, the prior art BM3D-AMP is in the order of points P32, P33 and P34, and the prior art TVAL3 is in the order of points P42, P43 and P44.

The actual test results show that when the compression ratios of the first link CSI of the first electronic apparatus are 1/16, 1/32 and 1/64, respectively, the reconstruction time of the prior art LASSO is in the order of points P22, P23 and P24, approximately $6 \times 10^{31\ 1}$ to $9 \times 10^{-1}$ second, while the reconstruction time of the first link CSI of the present disclosure (i.e., the encoding time of the CSI encoder plus the decoding time of the CSI decoder) is in the order of points P12, P13 and P14, approximately $9 \times 10^{-2}$ second, which is less than the reconstruction time of the prior art LASSO of the prior art. Therefore, the present disclosure can still obtain the reconstruction performance of the first link CSI even if using a very few amount of feedback messages, such that the present disclosure has very low time complexity to quickly reconstruct the first link CSI.

Similarly, when the compression ratios of the first link CSI of the first electronic apparatus are 1/16, 1/32 and 1/64, respectively, the reconstruction time (see points P12, P13 and P14) of the first link CSI of the present disclosure is less than the respective reconstruction time (see points P32, P33 and P34) of the prior art BM3D-AM and the respective reconstruction time (see points P42, P43 and P44) of the prior art TVAL. Therefore, the present disclosure can still obtain the reconstruction performance of the first link CSI even if using a very few amount of feedback messages, such that the present disclosure has very low time complexity to quickly reconstruct the first link CSI.

In summary, a communication system and a codec method based on deep learning and known channel state information (CSI) according to the present disclosure have at least the following features, advantages and technical efficacy.

The present disclosure reconstructs the first link CSI of the first electronic apparatus via the deep learning technique and the second link CSI (channel state information) of the second electronic apparatus. Therefore, the present disclosure can have a better performance than the prior art, and can perform well in any environment (e.g., an indoor environment or an outdoor environment).

In the processes of encoding (compressing) and decoding (restoring) the first link CSI, the present disclosure uses the correlation or similarity between the first link CSI and second link CSI. Therefore, the channel can have a good performance in any environment.

Compared with the prior art, the present disclosure, even if using a very few amount of feedback messages, can still obtain a good reconstruction performance of the first link CSI, and have very low time complexity to quickly reconstruct the first link CSI.

There is no specific limit to the encoding (compressing) and decoding (restoring) techniques provided by the present disclosure. Therefore, the present disclosure can be applied in any practical application.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A communication system based on deep learning and known channel state information (CSI), comprising:
    a first electronic apparatus including a known first link CSI and a CSI encoder having a deep learning function; and
    a second electronic apparatus including a known second link CSI and a CSI decoder having another deep learning function,
    wherein the first link CSI and the second link CSI have a correlation or a similarity, the CSI encoder of the first electronic apparatus encodes or compresses the first link CSI into a first codeword, and feeds the first codeword back to the second electronic apparatus via a feedback link, and
    wherein the CSI decoder of the second electronic apparatus encodes or compresses the second link CSI of the second electronic apparatus into a second codeword, and decodes or restores the first link CSI of the first electronic apparatus based on the first codeword encoded or compressed by the CSI encoder of the first electronic apparatus and the second codeword encoded or compressed by the CSI decoder of the second electronic apparatus.

2. The communication system of claim 1, wherein the CSI encoder of the first electronic apparatus pre-processes the first link CSI, and includes an encoder configured for encoding or compressing the pre-processed first link CSI into the first codeword.

3. The communication system of claim 2, wherein the encoder of the first electronic apparatus comprises at least one of a convolution layer, a batch normalization layer, an activation function layer and a pooling layer, provides an encoding process or a compressing process using the at least one of the convolution layer, the batch normalization layer, the activation function layer and the pooling layer, and encodes or compresses the first link CSI into the first codeword based on the encoding process or the compressing process.

4. The communication system of claim 1, wherein the CSI decoder of the second electronic apparatus comprises:
    an encoder configured for encoding or compressing the second link CSI into the second codeword; and
    a decoder configured for decoding or restoring the first codeword and the second codeword into a three-layer dimension channel matrix.

5. The communication system of claim 4, wherein the encoder of the second electronic apparatus comprises at least one of a convolution layer, a batch normalization layer, an activation function layer and a pooling layer, provides an encoding process and a compressing process using the at least one of the convolution layer, the batch normalization layer, the activation function layer and the pooling layer, and encodes or compresses the second link CSI into the second codeword based on the encoding process or the compressing process.

6. The communication system of claim 4, wherein the decoder of the second electronic apparatus comprises at least one of a bilinear upsampling layer, a convolution layer, a batch normalization layer, a first activation function layer and a second activation function layer, provides a decoding process or a restoring process using the at least one of the bilinear upsampling layer, the convolution layer, the batch normalization layer, the first activation function layer and the second activation function layer, and decodes or restores the first codeword and the second codeword into the three-layer dimension channel matrix based on the decoding process or the restoring process.

7. The communication system of claim 4, wherein the CSI decoder of the second electronic apparatus further comprises a neutral network having a memorizing function configured for decoding or restoring the first link CSI from the three-layer dimension channel matrix.

8. The communication system of claim 7, wherein the neutral network having the memorizing function is a recurrent neutral network (RNN) or a long short-term memory (LSTM) network composed of multiple layers of LSTM units.

9. A codec method based on deep learning and known channel state information (CSI), comprising:
providing a first electronic apparatus including a known first link CSI and a CSI encoder having a deep learning function and a second electronic apparatus including a known second link CSI and a CSI decoder having another deep learning function, wherein the first link CSI and the second link CSI have a correlation or a similarity;
encoding or compressing, by the CSI encoder of the first electronic apparatus, the first link CSI into a first codeword, feeding the first codeword back to the second electronic apparatus via a feedback link, and encoding or compressing, by the CSI decoder of the second electronic apparatus, the second link CSI of the second electronic apparatus into a second codeword; and
decoding or restoring, by the CSI decoder of the second electronic apparatus, the first link CSI of the first electronic apparatus based on the first codeword encoded or compressed by the CSI encoder of the first electronic apparatus and the second codeword encoded or compressed by the CSI decoder of the second electronic apparatus.

10. The codec method of claim 9, further comprising pre-processing, by the CSI encoder of the first electronic apparatus, the first link CSI, wherein the CSI encoder of the first electronic apparatus includes an encoder configured for encoding or compressing the pre-processed first link CSI into the first codeword.

11. The codec method of claim 10, further comprising providing an encoding process or a compressing process using at least one of a convolution layer, a batch normalization layer, an activation function layer and a pooling layer of the encoder and encoding or compressing the first link CSI into the first codeword based on the encoding process or the compressing process.

12. The codec method of claim 9, further comprising encoding or compressing, by an encoder of the CSI decoder of the second electronic apparatus, the second link CSI into the second codeword, and decoding or restoring, by a decoder of the CSI decoder of the second electronic apparatus, the first codeword and the second codeword into a three-layer dimension channel matrix.

13. The codec method of claim 12, further comprising providing an encoding process or a compressing process using at least one of a convolution layer, a batch normalization layer, an activation function layer and a pooling layer of the encoder and encoding or compressing the second link CSI into the second codeword based on the encoding process or the compressing process.

14. The codec method of claim 12, further comprising providing a decoding process or a restoring process using at least one of a bilinear upsampling layer, a convolution layer, a batch normalization layer, a first activation function layer and a second activation function layer of the decoder and decoding or restoring the first codeword and the second codeword into the three-layer dimension channel matrix based on the decoding process or the restoring process.

15. The codec method of claim 12, further comprising restoring, by a neutral network having a memorizing function in the CSI decoder of the second electronic apparatus, the first link CSI from the three-layer dimension channel matrix.

16. The codec method of claim 15, wherein the neutral network having the memorizing function is a recurrent neutral network (RNN) or a long short-term memory (LSTM) network composed of multiple layers of LSTM units.

* * * * *